(12) United States Patent
Zinser et al.

(10) Patent No.: US 7,837,173 B2
(45) Date of Patent: Nov. 23, 2010

(54) REARVIEW MIRROR BRACKET

(75) Inventors: Craig H. Zinser, Clarkston, MI (US); Dennis B. Kazensky, Farmington Hills, MI (US); James J. Czewski, Troy, MI (US); William C. Bisnack, Macomb, MI (US); Nicholas P. Nagrant, Farmington Hills, MI (US); Thomas D. Hagen, Grand Blanc, MI (US); Kent S. Lybecker, St. Clair Shores, MI (US); Ryan M. Frakes, Bloomfield Hills, MI (US); Mark R. Willey, Grand Blanc, MI (US); Benjamin H. Baker, Davison, MI (US); Patrick D. Walmsley, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 90 days.

(21) Appl. No.: 12/249,255

(22) Filed: Oct. 10, 2008

(65) Prior Publication Data
US 2010/0090086 A1    Apr. 15, 2010

(51) Int. Cl.
*A47F 7/14* (2006.01)
(52) U.S. Cl. .................................. 248/475.1
(58) Field of Classification Search ............. 248/475.1, 248/476; 359/872, 876; 296/1.11
See application file for complete search history.

(56) References Cited

U.S. PATENT DOCUMENTS 6,250,148 B1 * 6/2001 Lynam .................... 73/170.17

| | | | |
|---|---|---|---|
| 2004/0145904 A1* | 7/2004 | DeLine et al. | 362/494 |
| 2005/0141230 A1* | 6/2005 | DeLine et al. | 362/494 |
| 2007/0265755 A1* | 11/2007 | Heslin et al. | 701/49 |
| 2008/0130149 A1* | 6/2008 | Blank et al. | 359/838 |
| 2009/0103183 A1* | 4/2009 | DeLine et al. | 359/632 |
| 2009/0141331 A1* | 6/2009 | Skiver et al. | 359/263 |

OTHER PUBLICATIONS

Lane Departure Warning System. Automotive Safety Technologies | Warning Systems, Wikepedia, the free encyclopedia [online], [retrieved Oct. 6, 2008]. Retrieved from Internet: <URL: http://en.wikipedia.org/wiki/Lane_departure_warning_system.
Image Mirror Assembly 2008 Mercedes Benz, printed on Oct. 9, 2008.
Image of Mirror Assembly 2008 Audi A8L, printed on Oct. 9, 2008.

* cited by examiner

*Primary Examiner*—Ramon O Ramirez
(74) *Attorney, Agent, or Firm*—Ingrassia Fisher & Lorenz, P.C.

(57) ABSTRACT

According to various exemplary embodiments, an apparatus is provided for mounting a rearview display and one or more electronic components in a vehicle. An example of the apparatus comprises an inside rearview assembly for mounting an electronic component near a windshield of a vehicle including a mirror and an adjustable support connected to the mirror. The rearview assembly also includes a bracket configured to mount on the windshield, including an attaching structure configured to attach the bracket to the windshield and a support frame coupled to the attaching structure. The support frame has a portion set off from the windshield to accommodate the electronic component between the windshield and the set off portion. The support frame is connected to the adjustable support.

20 Claims, 7 Drawing Sheets

REARVIEW MIRROR BRACKET

TECHNICAL FIELD

The present invention generally relates to rearview mirror assemblies for passenger vehicles.

BACKGROUND

In a passenger vehicle, one of the important safety features is a rearview mirror. A rearview mirror is commonly mounted directly onto a windshield so that the driver can easily see objects and traffic behind the vehicle. In addition to facilitating a view toward the rear of the vehicle, it is important for the driver of the vehicle to have a clear view of the road ahead through the windshield. Rearview mirrors are commonly mounted on the windshield using a "mirror button" in a location that will not obscure the driver's view of the road. Often this location is near the centerline of the windshield.

In recent years, various new safety devices and other features have been developed. Some of these devices are ideally mounted in a vehicle against, or near, the windshield. A lane detection warning camera, for example, is typically designed to capture an image of the road ahead and to determine the location of the lanes. A computer determines the vehicle's trajectory to warn the driver if the vehicle is about to leave a lane without signaling. One method of capturing images of the road ahead is to mount a camera behind the windshield near the centerline of the windshield. There is generally limited space, however, to mount objects to a windshield without limiting the driver's view of the road ahead.

Accordingly, it is desirable to mount one or more electronic devices or components near a windshield without significantly obscuring the driver's view of the road. Furthermore, other desirable features and characteristics of the present invention will become apparent from the subsequent detailed description and the appended claims, taken in conjunction with the accompanying drawings and the foregoing technical field and background.

SUMMARY

According to various exemplary embodiments, an apparatus is provided for mounting a rearview display and one or more electronic components in a vehicle. An example apparatus comprises an inside rearview assembly for mounting electronic components near a windshield of a vehicle, including a mirror and an adjustable support connected to the mirror. The inside rearview assembly also includes a bracket configured to mount on the windshield, including an attaching structure configured to attach the bracket to the windshield and a support frame coupled to the attaching structure. The support frame has a portion set off from the windshield to accommodate one of the electronic components between the windshield and the set off portion. The support frame is connected to the adjustable support.

Another example of an apparatus comprises a bracket for mounting electronic components and a rearview display proximate to a windshield. The bracket includes a support frame configured to mount adjacent to the windshield. The support frame includes multiple raised support members extending away from a portion of the windshield, and a cross-support member attached to the multiple raised support members. The multiple raised support members and cross-support members create a region between the multiple raised support members to mount one of the electronic components. The support frame also includes a mirror mounting structure connected to the cross-support member that is configured to mount the rearview display.

Another example of an apparatus comprises a passenger vehicle having a centerplane. The vehicle includes a windshield having a centerline traversing the centerplane of the vehicle. A support frame is mounted along the centerplane of the vehicle and adjacent to the centerline of the windshield. The support frame includes an attaching structure attaching the support frame to the windshield and a mirror mounting support mounting a rearview display substantially along the centerplane of the vehicle. The mirror mounting support is set off from the windshield. The support frame also includes a first mounting structure supporting a first electronic device between the mirror mounting support and the windshield along the centerline of the windshield. The support frame supporting the first electronic device such that a portion of the first electronic device has access to the windshield along the centerline of the windshield. Other features and embodiments are described more fully below.

DESCRIPTION OF THE DRAWINGS

A more complete understanding of the subject matter may be derived by referring to the detailed description and claims when considered in conjunction with the following figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In an exemplary embodiment a bracket is designed to be mounted against a windshield and to support the rearview mirror away from the windshield so that a camera or other device may be inserted between the windshield and the mirror. The bracket may have other structures for supporting other devices or components including those components that are ideally mounted on the windshield near the centerline of the windshield. Inside rearview mirrors are often mounted using a "mirror button" that is bonded to the windshield. In the exemplary embodiment a similar structure to a mirror button is formed in the bracket so that a standard mirror may be mounted to the bracket instead of the windshield, thus providing additional space for other devices and objects to be mounted adjacent to the windshield.

Details of several exemplary embodiments will now be presented with particular reference to the drawing figures.

Figure 1:
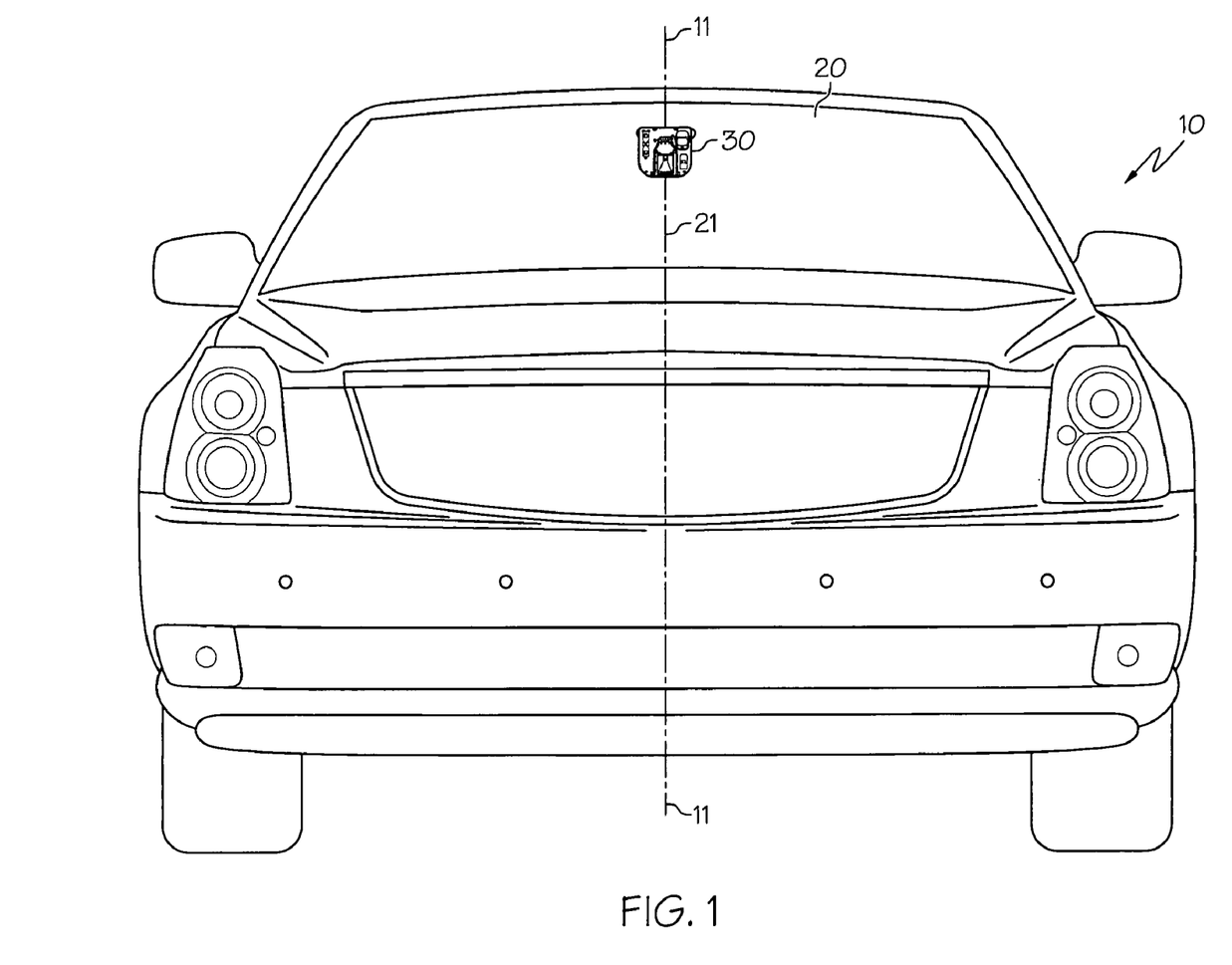
FIG. 1 is a front view of an exemplary vehicle.

FIG. 1 shows a vehicle 10 with a windshield 20 and an exemplary rearview assembly 30 located on windshield 20 at or near centerline 21.

Vehicle 10 may be any vehicle where an operator desires front and rear views. In an exemplary embodiment, vehicle 10 is a passenger vehicle designed primarily to transport people. In other embodiments, vehicle 10 may be any other vehicle such as an automobile, truck, sports utility vehicle, other vehicles designed to transport passengers, cargo, and/or other items. In the exemplary embodiment of FIG. 1, vehicle 10 includes conventional front, back, and sides. Vehicle 10 may be conceptually described as having a centerplane 11-11 running along the center of vehicle 10 along a plane running the same direction as the sides of vehicle 10, and substantially equidistant from the sides of vehicle 10.

Windshield 20 is any feature designed to allow the driver of vehicle 10 to have a clear view of an area in front of vehicle 10. Windshield 20 may be conceptualized as having a centerline 21 that is substantially parallel to and aligned with centerplane 11-11 of vehicle 10. Centerplane 11-11 of vehicle 10 and centerline 21 of windshield 20 are drawn on FIG. 1 for the purpose of discussion; these lines represent conceptual lines and planes that may not be visible on an exemplary embodiment.

Rearview assembly 30 is any system with a mounting structure for mounting in a location to allow a driver to view objects behind vehicle 10. An exemplary embodiment of rearview assembly 30 is shown in FIG. 1, and is also shown in greater detail in the exemplary embodiments shown in FIGS. 2-4. Rearview assembly 30 of FIGS. 2-4 suitably includes a bracket 40, an adjustable support 31, and a mirror 32.

Figure 2:
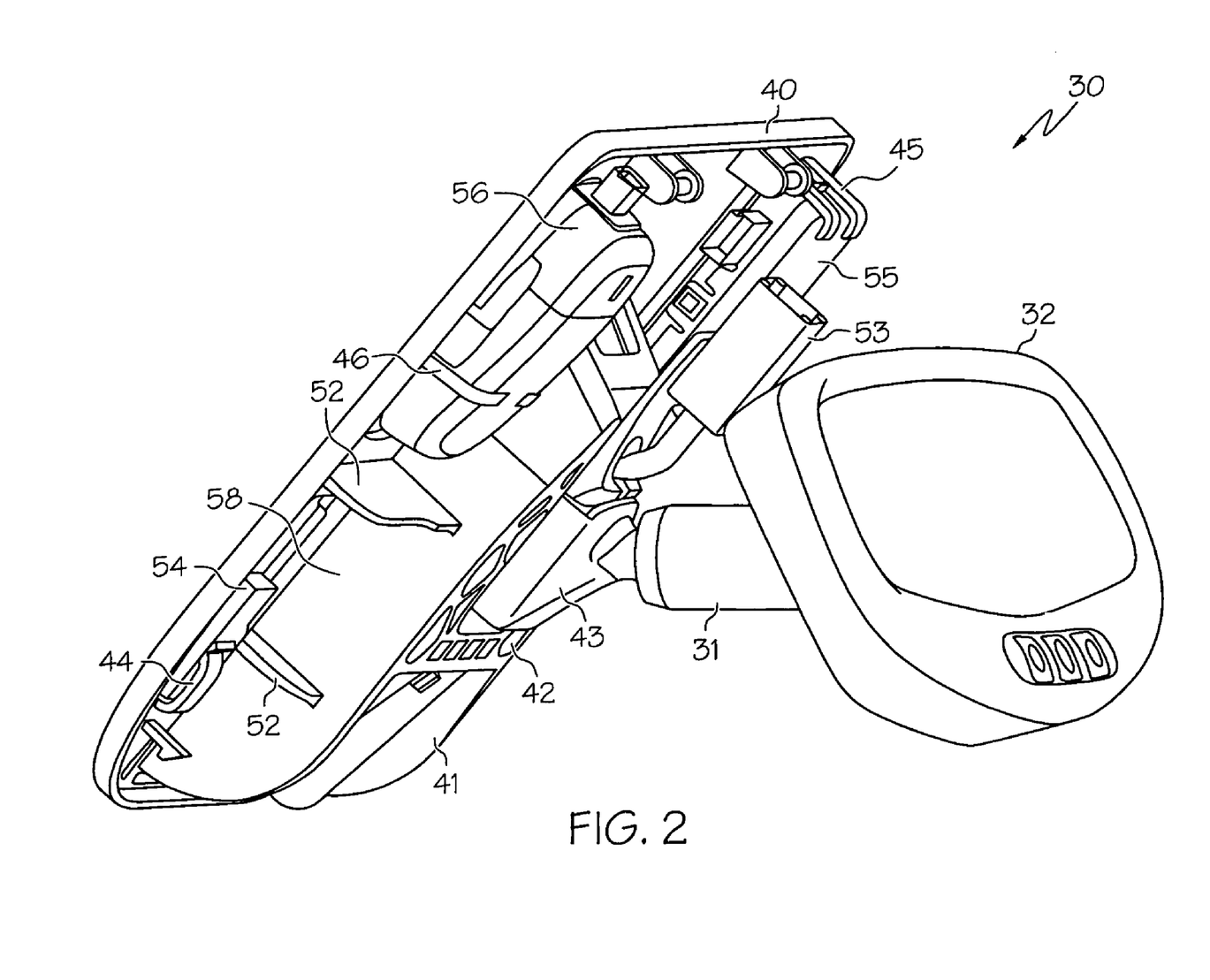
FIG. 2 is a side view of an exemplary rearview assembly.

FIG. 2 shows a perspective view of an exemplary rearview assembly 30 of FIG. 1. Mirror 32 is shown mounted to bracket 40. Exemplary bracket 40 shows multiple devices mounted to allow sensing or vision through windshield 20.

Bracket 40 is any structure designed to be mounted and designed to support an object. Bracket 40 may be designed to support components or devices at or near windshield 20. Examples of components supported by bracket 40 may include any sort of electronic components or devices, as well as other types of components and devices that may not have any electronics. In various exemplary embodiments, bracket 40 could be designed to physically support one or more of adjustable support 31, mirror 32, humidity sensor 54, radio frequency sensor 55, rain sensor 56, lane departure warning camera 57 (shown in FIG. 3), and/or other features as appropriate.

Mirror 32 is any device that allows the driver of vehicle 10 to see objects behind the driver. Mirror 32 may be a conventional rearview mirror, such as a mirror formed of glass with a reflective coating enclosed in a housing, but is not limited to reflective components. For example, in equivalent embodiments, mirror 32 is a display from a camera that is attached in the rear portion of vehicle, and that provides a view of objects behind vehicle 10.

Adjustable support 31 is any structure that connects mirror 32 to support frame 41 and that allows for adjustment of the position of mirror 32. Adjustable support 31 may allow for a relatively small and/or large adjustment of the position of mirror 32. In one exemplary embodiment shown in FIGS. 2 and 4, adjustable support 31 has a first adjustable ball joint at a first end near bracket 40, and a second adjustable ball joint at a second end near mirror 32. In alternative embodiments, adjustable support 31 may have one or more structures for adjusting the position of mirror 32. Such structures may be any sort of cams, levers, hinges, screws, bolts, threaded rods, wedges, and/or other adjusting structures as appropriate.

In the example embodiment of FIG. 2, electronic devices and components are used that have electrical connections. Electrical connections provide data communication and/or electrical power to the electronic devices and components. Bracket 40 may have a wiring harness connected to one or more electronic component or device. The wiring harness may connect to a socket 53, for example, so that electronic devices or components can be supplied with power, and/or connected to a data communication system.

A support frame 41 is any structure that is designed to provide mechanical support to mount a component. Support frame 41, for example, may support an adjustable support 31 connected to a mirror 32. In an exemplary embodiment support frame 41 may include a set off portion 42, a mirror mounting support 51, raised support members 58, secondary support members 52, and a cross-support member 59.

Set off portion 42 is any part of bracket 40 that is at a distance from where bracket 40 is mounted. Set off portion 42 may be formed in any manner. FIG. 2 shows one embodiment with raised support members 58 and cross-support member 59 forming set off portion 42. In the exemplary embodiment of FIG. 2 set off portion 42 may be part of or coincide with cross-support member 59. In other embodiments, set off portion 42 may be separate from cross-support member 59. The set off portion 42 and other exemplary elements are further discussed below in conjunction with the exemplary embodiment shown in FIG. 3.

Figure 3:
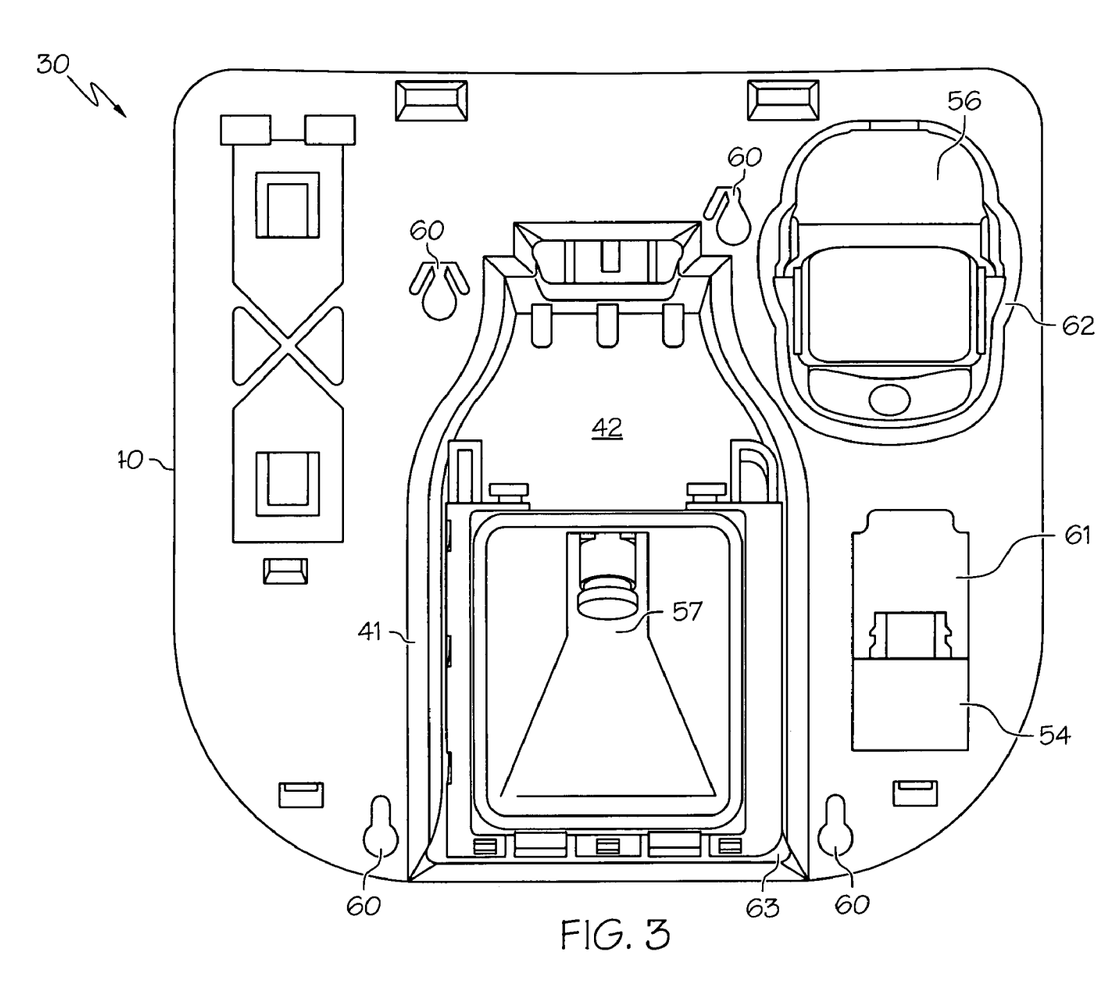
FIG. 3 is a top view of an exemplary rearview assembly.

In the exemplary embodiment of FIGS. 2 and 3, set off portion 42 is supported by support frame 41. For example, set off portion 42 may be set off from windshield 20. The distance between windshield 20 and set off portion 42 may be any useful distance based upon the size of supported components and/or other factors. For example, set off portion 42 may be set off from windshield 20 by about 30 mm (approximately 1 inch) or so, although other embodiments could provide any suitable distance. The distance, for example, may be a distance suitable for lane departure warning camera 57 to fit between set off portion 42 and windshield 20. Bracket 40 may have more than one set off portion 42, as desired.

FIG. 3 shows a top view of one embodiment of bracket 40. The top view of FIG. 3 shows the side of exemplary bracket 40 that is designed to be mounted next to windshield 20. In the exemplary embodiment of FIG. 3, a lane departure warning camera 57 is shown mounted in bracket 40. In other embodiments additional or alternative component could be provided. Further exemplary embodiments of bracket 40 and support frame 41 are discussed below with regard to the exemplary embodiment shown in FIG. 4.

Figure 4:
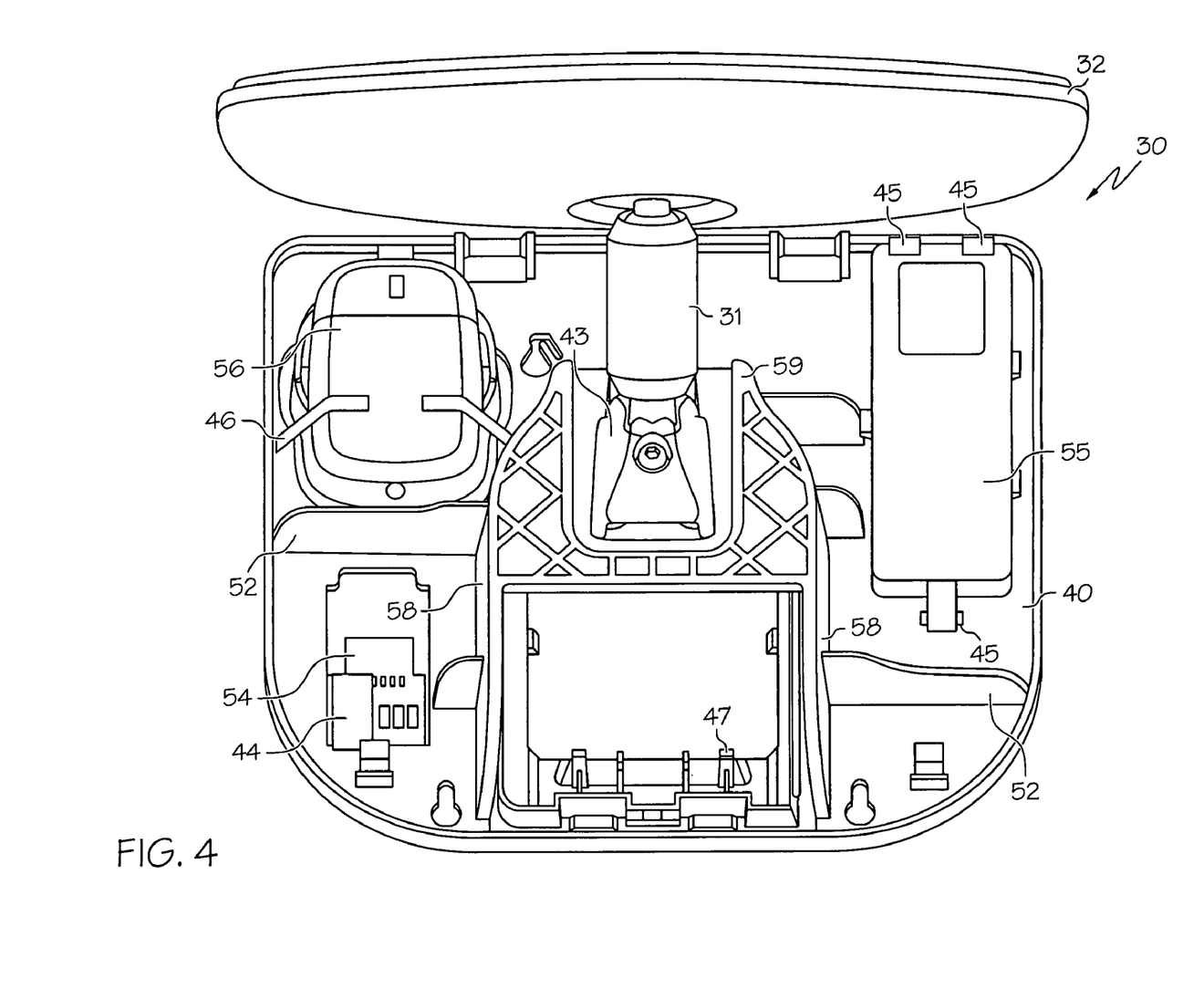
FIG. 4 is a bottom view of an exemplary rearview assembly.

FIG. 4 shows a bottom perspective view of one embodiment of bracket 40. This view is opposite the top view of FIG. 3, and is an example of how bracket 40 might appear from inside vehicle 10.

As discussed previously, support frame 41 is any structure that is designed to provide mechanical support to mount a component. In one exemplary embodiment shown in FIG. 4, support frame 41 includes raised support members 58 and cross-support member 59. In other alternative embodiments, support frame 41 may be formed from structures which can be described as arches, beams, braces, brackets, buttresses, columns, cantilevers, crutches, mounts, pedestals, pilasters, pillars, pegs, posts, shores, stakes, stanchions, stands, stays, stilts, webs, walls and/or other similar structures.

Raised support members 58 are any structural members capable of providing strength to a structure. In the exemplary embodiment shown in FIG. 4, raised support members 58 are part of support frame 41 that provides strength and support to cross-support member 59. Raised support members 58 may be integrally formed as part of support frame 41 or may be formed separately and assembled to create support frame 41. Support frame, for example, may be formed with a single injection mold to include raised support members 58 and cross-support member 59.

In an alternative exemplary embodiment, support frame 41 is formed in separate parts from material such as metal, plastics, and/or resins. Raised support members 58 and cross-support member 59 are then attached by bonding or welding and/or another process to form support frame 41.

Raised support members 58 and cross-support member 59 may form a region between raised support members 58 to mount an electronic component or device. In the example embodiment shown in FIG. 4, support frame 41 supports the lane departure warning camera 57. In alternative embodiments, support frame 41 may support a different device or component, and/or may support more than one electronic component or device.

Cross-support member 59 is any structural member that is supported by another structural member. In the exemplary embodiment shown in FIG. 4, cross-support member 59 is part of support frame 41, and is supported by raised support members 58. Cross-support member 59 may be substantially one continuous structure piece, or alternatively, may be multiple pieces connected together to form cross-support member 59.

Secondary support members 52 are any structural members capable of reinforcing the strength of a structure. In the exemplary embodiment, secondary support members 52 are part of support frame 41, and may be used to provide reinforcement and additional strength to raised support members 58. Using secondary support members 52 in the exemplary embodiment is one example of a method of providing support for structures such as adjustable support 31, mirror 32, and/or other components.

Structural characteristics for support frame 41 are selected based on factors including the size and weight of components supported by support frame 41. Support frame may provide required structural support with or without specific components discussed in the exemplary embodiments, such as secondary support members 52, raised support members 58 and/or cross-support member 59. Support frame 41 may be formed using various methods, materials, and/or dimensions to provide support for components.

In the exemplary embodiment shown in FIG. 4, bracket 40 includes support frame 41, and multiple mounting structures for one or more electronic components such as a humidity sensor support 44, a radio frequency sensor support 45, a rain sensor support 46, and/or a lane departure warning camera support 47. Electronic components or devices may be mounted on bracket 40, on support frame 41, and/or on other parts of bracket 40.

Figure 5:
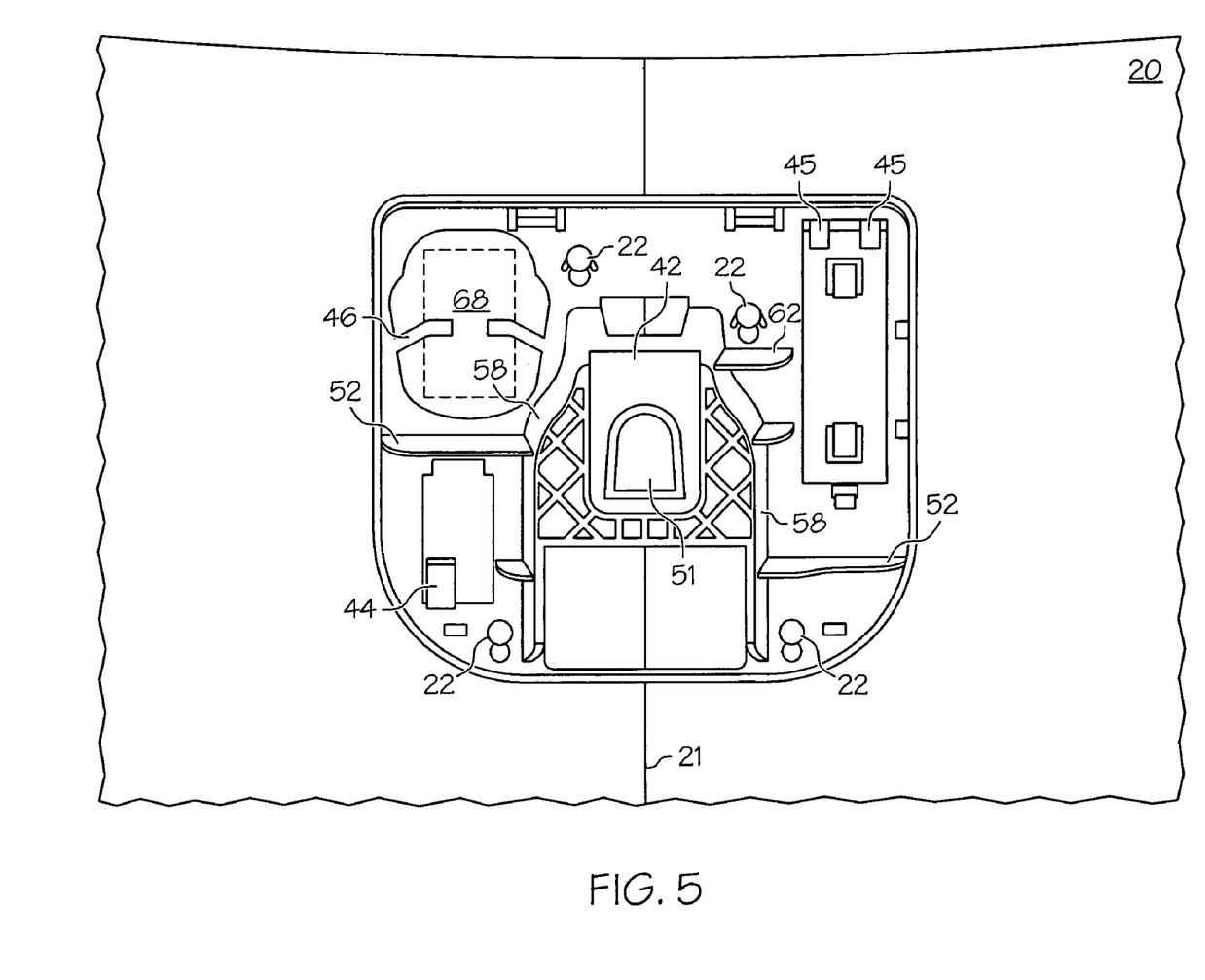
FIG. 5 is a bottom view of an exemplary bracket connected to a windshield.

FIG. 5 shows an exemplary embodiment with bracket 40 mounted to a portion of windshield 20. Components and devices such as mirror 32, and lane departure warning camera 57 have not been installed in this exemplary view. Mirror mounting support 51 in an exemplary embodiment is shaped as a mirror button and is a mounting structure for supporting mirror mounting structure 43 (shown in FIG. 4).

Mirror mounting structure 43 is any structure capable of mounting mirror 32 to bracket 40. In the exemplary embodiment shown in FIGS. 4 and 5, mirror mounting structure 43 is part of adjustable support 31, and may include any structure for connecting mirror 32 to mirror mounting support 51. Mirror mounting structure 43, for example, may be a locking wedge structure with a locking screw. Other mounting structures may be used such as brackets with screws or bolts, clamps, bond surfaces, pins, and/or other structures. Mirror mounting support 51 may be formed as an integral part of bracket 40, or formed separately and attached to bracket 40.

Bracket 40 may also include attaching structures 60, and/or openings for electronic devices or components. For example, the embodiment of FIG. 3 includes a humidity sensor opening 61, a rain sensor opening 62, and a camera opening 63, although other embodiments may omit one or more of these features and/or may provide alternative openings.

Bracket 40 includes openings and mounting structures based on the design requirement of mounted components. For example, humidity sensor 54, shown in FIG. 4 is a humidity sensor which measures the humidity of the air near windshield 20, and the temperature of an inside surface of windshield 20. The exemplary humidity sensor 54 is designed to contact the windshield to perform at least one of these measurements. To meet these exemplary design requirements, humidity sensor support 44 is formed in bracket 40, for example, as shown in FIG. 5, for supporting humidity sensor 54 against windshield 20. Humidity sensor opening 61 may be formed as part of bracket 40 to allow humidity sensor 54 to directly contact windshield 20.

Mounting structures (44, 45, 46, and/or 51) or mounting supports are any structure capable of generally retaining an object in a location. For example, the exemplary embodiment of FIG. 5 includes mounting structures (44, 45, and 46) with plastic arms that deform and create tension to hold a component in place. Alternatively mounting structures may be elastic bands, brackets with screws or bolts, and/or any other structure. Other mounting structures may be used such as brackets with screws or bolts, clamps, bond surfaces, pins, and/or other structures. In another alternative embodiment, a mounting structure is an enclosure cavity that supports an object, and that is held in place by contact on multiple sides of the cavity, and/or by gravity.

Mounting structures (44, 45, 46, and/or 51) or mounting supports vary in shape, structure and size according to the object that is desired to be retained. In some cases, such as the example embodiment of humidity sensor support 44 shown in FIGS. 4 and 5, mounting structures retain a component substantially without movement relative to an object. Humidity sensor 54, for example, is held substantially without movement relative to windshield 20. In other cases, mounting structures allow for some movement of a mounted object. A mounting structure or mounting support may be formed as part of another structure, or may be formed separately and connected to a structure.

In one exemplary embodiment shown in FIGS. 4 and 5, bracket 40 includes lane departure warning camera support 47 such that a portion of lane departure warning camera 57 has access to windshield 20 along centerline 21. Bracket 40 and support frame 41 may have openings to provide access to windshield 20 for other electronic components or devices such as rain sensor opening 62 and camera opening 63, as shown by way of example in FIG. 5.

In an exemplary method of mounting bracket 40 in vehicle 10, rearview assembly 30 is attached to windshield 20 by first connecting bonding buttons 22 to windshield 20 using a bonding agent. Bracket 40 with attaching structures 60, is then connected to bonding buttons 22 to support the bracket adjacent to the windshield 20 as shown in FIG. 5. With bracket 40 attached adjacent to windshield 20 in the exemplary embodiment, electronic components or devices may be connected to support structures on bracket 40. With bracket 40 in position in vehicle 10, mirror 32 is attached to mirror mounting support 51 using mirror mounting structure 43 (as shown in FIG. 4).

Bracket 40, as shown in an exemplary embodiment in FIG. 5, is formed from any material. In one exemplary embodiment, bracket 40 is formed using structurally engineered plastic such as any plastic compound with structurally reinforcement components. Glass fiber, for example, may be added to a plastic compound to produce a structurally engineered plastic. Other examples such as carbon fiber and resins could also be used to create structurally engineered plastic. Alternatively, bracket 40 may be formed from metal, composite material, non-engineered plastic, and/or other material. In one exemplary embodiment, bracket 40 is formed from an injection mold process. Other embodiments could use any other technique or process for forming bracket 40.

Bracket 40 is produced in various shapes and sizes to accommodate multiple combinations of components and devices. The various brackets may have a common configuration of attaching structures 60 to simplify the process of mounting bracket 40 onto windshield 20. Exemplary embodiments and methods of mounting bracket 40 to windshield 20 are further discussed in relation to FIG. 6.

Figure 6:
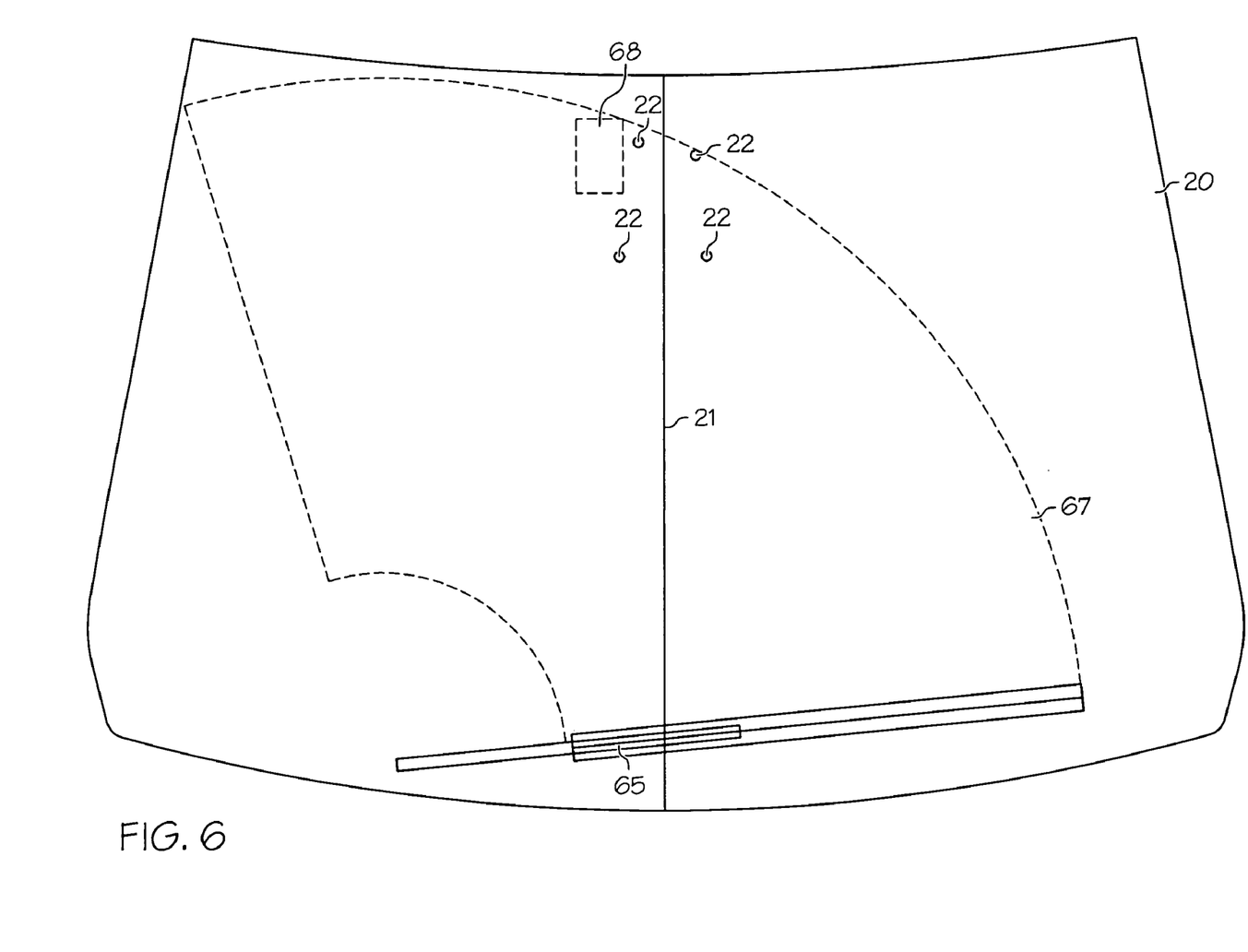
FIG. 6 is a view of an exemplary windshield.

FIG. 6 shows an exemplary embodiment with windshield 20, and a wiper blade 65. Windshield 20 is shown with part of an exemplary attaching structure as bonding buttons 22 bonded to windshield 20. In the exemplary embodiments of FIGS. 5 and 6, bonding buttons 22 and subsequently bracket 40 are shown mounted across centerline 21 of windshield 20. In alternative embodiments, bonding buttons 22 and bracket 40 may be mounted in other locations which are not adjacent to or across centerline 21. A bracket 40, for example, may be mounted on a passenger side of vehicle 10 in a location that does not substantially obstruct the driver's view of the road ahead.

Vehicle 10 of the exemplary embodiment includes windshield 20, and windshield wiper 65 as shown in FIG. 6. Windshield wiper 65 clears a first region 67 of the windshield 20. In the exemplary embodiment, bracket 40 is mounted in a position such that rain sensor 56 detects water, rain or snow, or other fluids, particles or matter on windshield 20 within a second region 68 that is inside first region 67.

The configuration of bonding buttons 22 shown in FIG. 6 may be used for brackets of different sizes. A single size template or frame could be used to mount bonding buttons in the configuration regardless of the specific options chosen for a specific vehicle. Alternatively, bracket 40 could also be produced with multiple mounting structures for devices or components, and devices could be installed, leaving some mounting structures empty, if a specific option was not chosen for a specific vehicle.

In an alternative method of mounting bracket 40 to windshield 20, a surface or multiple surfaces may be incorporated into bracket 40 to act as attaching structures for attaching bracket 40 to windshield 20. In the alternative embodiment, adhesive is applied to the surfaces and bracket 40 is pressed against windshield 20 until a sufficient bond is achieved.

In other alternative methods of mounting bracket 40, attaching structures are not supported directly by windshield 20, but are supported by an attaching structure connected to the vehicle body or frame.

Figure 7:
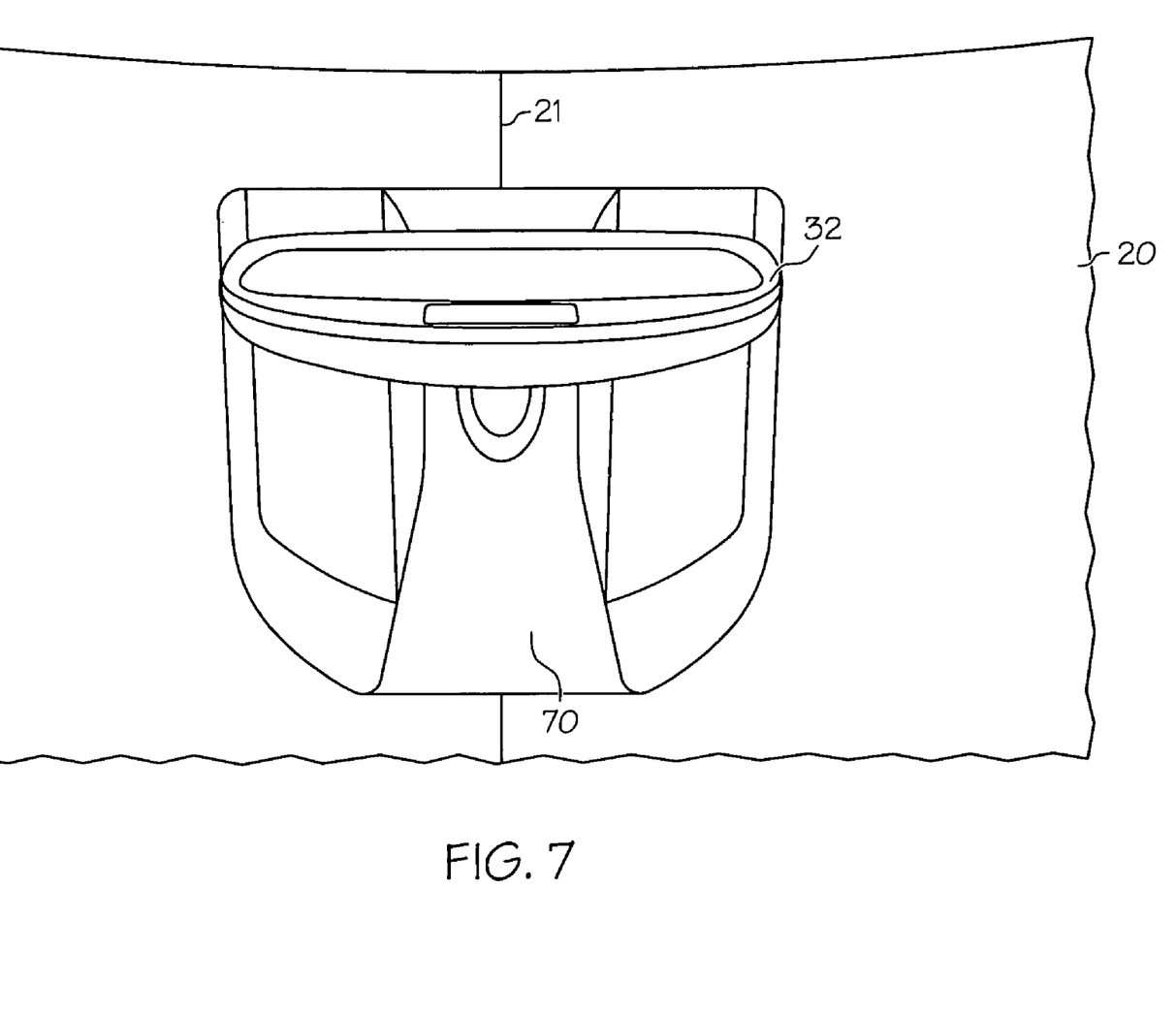
FIG. 7 is a bottom view of an exemplary rearview assembly with a cover.

FIG. 7 shows a bottom view of exemplary rearview assembly 30 with a cover 70 installed over a portion of bracket 40. Cover 70 may be part of bracket 40 and may have structures for supporting one or more component or device that will be held in place when cover 70 is connected as shown in the exemplary embodiment of FIG. 7. For example, cover 70 may include a rain sensor support and/or other support for components. Alternatively, bracket 40 may include rain sensor support 46 to hold rain sensor 56 in a proper operating position. Some electrical connections or other connections may be necessary before installing cover 70 onto bracket 40 (shown in FIG. 4).

The foregoing description refers to elements or nodes or features being "connected" or "coupled" together. As used herein, unless expressly stated otherwise, "connected" means that one element/node/feature is directly joined to (or directly communicates with) another element, node or other feature in a mechanical, logical, electrical or other appropriate sense. Likewise, unless expressly stated otherwise, "coupled" means that one element/node/feature is either directly or indirectly joined to (or directly or indirectly communicates with) another element/node/feature in a mechanical, logical, electrical or other appropriate sense. The term "exemplary" is used in the sense of "example," rather than "model." Further, although the figures may depict example arrangements of elements, additional intervening elements, devices, features, or components may be present in a practical embodiment.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An inside rearview assembly for mounting an electronic component to a windshield of a vehicle comprising:
   a mirror;
   an adjustable support connected to the mirror; and
   a bracket configured to mount the electronic component in contact with the windshield behind the mirror such that the adjustable support extends away from the bracket and the windshield to the mirror, the bracket comprising:
      an attaching structure configured to attach the bracket to the windshield and having a hole configured to accept the electronic component in contact with the windshield; and
      a support frame coupled to the attaching structure and to the adjustable support, the support frame having a set off portion extending from the bracket away from the windshield to accommodate the electronic component in the hole and between the windshield and the set off portion.

2. An inside rearview assembly according to claim 1 the support frame further comprising:
   a mirror mounting support to connect the adjustable support to the set off portion set off from the windshield.

3. An inside rearview assembly according to claim 1, the bracket further comprising multiple mounting structures configured to mount multiple electronic components.

4. An inside rearview assembly according to claim 1 wherein the attaching structure comprises multiple bonding buttons configured to bond to the windshield of the vehicle.

5. A bracket for mounting an electronic component to a windshield behind a rearview mirror, the bracket comprising:
   a support frame configured to mount to the windshield, the support frame comprising:
      an attaching structure configured to mount to the face of the windshield, the attaching structure having at least one hole configured to accept the electronic component so that the electronic component is in contact with the windshield;
   multiple raised support members extending away from a the attaching structure and the windshield; and a cross-support member attached to the multiple raised support members, to thereby create a region between the multiple raised support members, the cross support member, and the windshield to mount the electronic component in the at least one hole so that the electronic component contacts with the windshield; and a mirror mounting support connected to the cross-support member that is configured to mount the rearview mirror on the opposite side of the electronic component from the windshield so that the driver's view of the electronic component is at least partially obscured by the mirror.

6. A bracket according to claim 5 wherein the electronic component is a lane departure warning camera.

7. A bracket according to claim 5 wherein the mirror mounting support comprises a mirror button integrally connected to the cross-support member.

8. A bracket according to claim 5 wherein the support frame is formed of structurally engineered plastic.

9. A bracket according to claim 5 wherein the at least one hole of the attaching structure comprises multiple holes each configured to accept and mount one of a plurality of multiple electronic components in contact with the windshield.

10. A bracket according to claim 9 wherein the multiple mounting structures comprise:
   a humidity sensor support structure configured to support a humidity sensor in contact with the windshield;
   a radio frequency sensor support structure configured to support a radio frequency sensor; and
   a rain sensor support structure configured to support a rain sensor adjacent to the windshield.

11. A bracket according to claim 10 wherein the bracket further comprises an electrical socket to connect the multiple electronic components to a power source and to a data communication system.

12. A bracket according to claim 5 wherein the multiple raised support members and the cross-support member are integrally formed.

13. A passenger vehicle comprising:
   a windshield; and
   a bracket mounted to the windshield, the bracket comprising:
      a predominantly flat attaching structure attaching the bracket to a face of the windshield and having a hole;
      a mirror mounting support mounting a rearview mirror, wherein the mirror mounting support is set off from the windshield; and
      a first mounting structure supporting a first electronic device behind the mirror mounting support and against the windshield, the bracket supporting the first electronic device such that a portion of the first electronic device is placed in the hole in the bracket and in contact with the windshield behind the mirror.

14. A passenger vehicle according to claim 13 wherein the bracket is formed of structurally engineered plastic.

15. A passenger vehicle according to claim 13 wherein the bracket further comprises a second mounting structure configured to support a second electronic device.

16. A passenger vehicle according to claim 15 further comprising a windshield wiper, wherein the windshield has a region cleared by the windshield wiper, and wherein the second mounting structure is configured to support a rain sensor in relation to the windshield such that the rain sensor detects a condition of the windshield in a portion of the region cleared by the windshield wiper.

17. A passenger vehicle according to claim 13 wherein the first mounting structure is configured to support a camera, and wherein the bracket has multiple mounting structures configured to mount multiple electronic devices, the multiple mounting structures comprising:
   a humidity sensor support structure configured to support a humidity sensor in contact with the windshield;
   a radio frequency sensor support structure configured to support a radio frequency sensor;
   a rain sensor support structure configured to support a rain sensor adjacent to the windshield.

18. A passenger vehicle according to claim 13 wherein the passenger vehicle has a centerplane, wherein the windshield has a centerline traversing the centerplane, and wherein the bracket is mounted along the centerplane of the passenger vehicle, and adjacent to the centerline of the windshield.

19. A passenger vehicle according to claim 18 wherein the rearview mirror is mounted substantially along the centerplane of the passenger vehicle.

20. A passenger vehicle according to claim 13 wherein the bracket further comprises an electrical socket for connecting the first electronic device to a power source and to a data communication system.

\* \* \* \* \*